United States Patent [19]

Relyea

[11] Patent Number: 4,849,061

[45] Date of Patent: Jul. 18, 1989

[54] METHOD OF MAKING PLASTIC FILTER UNITS HAVING A WELDED CELLULOSE FILTER

[75] Inventor: Robert G. Relyea, Farmington, N.Y.

[73] Assignee: Manufactures Hanover Trust Company, New York, N.Y.

[21] Appl. No.: 83,048

[22] Filed: Aug. 10, 1987

Related U.S. Application Data

[62] Division of Ser. No. 875,206, Jun. 17, 1986, Pat. No. 4,702,834.

[51] Int. Cl.[4] ............................................. B32B 31/20
[52] U.S. Cl. .................................. 156/308.4; 156/293; 210/321.78; 210/321.87; 210/455; 210/474; 210/500.29; 422/101; 422/255

[58] Field of Search .................... 156/308.4, 293; 422/101, 255; 210/321.78, 321.87, 455, 474, 500.29

[56] References Cited

U.S. PATENT DOCUMENTS

| | | | |
|---|---|---|---|
| 3,471,019 | 10/1969 | Trasen et al. | 210/94 |
| 4,302,270 | 11/1981 | Nicolet | 156/308.4 |
| 4,357,240 | 11/1982 | Mehra et al. | 422/101 |
| 4,597,868 | 7/1986 | Watanabe | 210/321.84 |

Primary Examiner—John J. Gallagher
Attorney, Agent, or Firm—Marjama & Pincelli

[57] ABSTRACT

A plastic filterware having a filter membrane made at least in part of cellulose nitrate welded to the filterware and a method of making same.

13 Claims, 3 Drawing Sheets

METHOD OF MAKING PLASTIC FILTER UNITS HAVING A WELDED CELLULOSE FILTER

This is a divisional of application Ser. No. 875,206, filed on June 17, 1986, now U.S. Pat. No. 4,702,834.

The present invention is directed to laboratory filterware and more particularly to a plastic laboratory filterware having a cellulose nitrate filter membrane welded to the filterware.

In the prior art filter membranes have been secured to laboratory filterware either by mechanical means, that is, by crimping or sandwiching a part of the filter membrane between two elements as illustrated in U.S. Pat. No. 3,295,686 or by welding the filter membrane to a support plate by ultrasonic welding as discussed in U.S. Pat. No. 4,357,240.

Cellulose nitrate filter membranes have been limited to mechanical securing means due to its very volatile nature. When exposed to heat a cellulose nitrate membrane can suddenly burst into flames. Accordingly, it has always been necessary to mechanically secure the cellulose nitrate filter membrane to the filterware.

Applicants have quite unexpectedly discovered that under certain conditions a cellulose nitrate filter can be welded to a plastic filterware.

SUMMARY OF THE PRESENT INVENTION

The present invention is directed to a plastic filterware having a cellulose nitrate filter membrane welded thereto and a method of welding the cellulose nitrate membrane to the plastic filterware. The method comprises the steps of: placing a cellulose nitrate membrane filter on a plastic support plate; and then applying heat and pressure to at least a portion of the membrane for a specified period of time so as to weld the filter membrane to the support plate.

DETAILED DESCRIPTION OF THE PRESENT INVENTION

Figure 1:
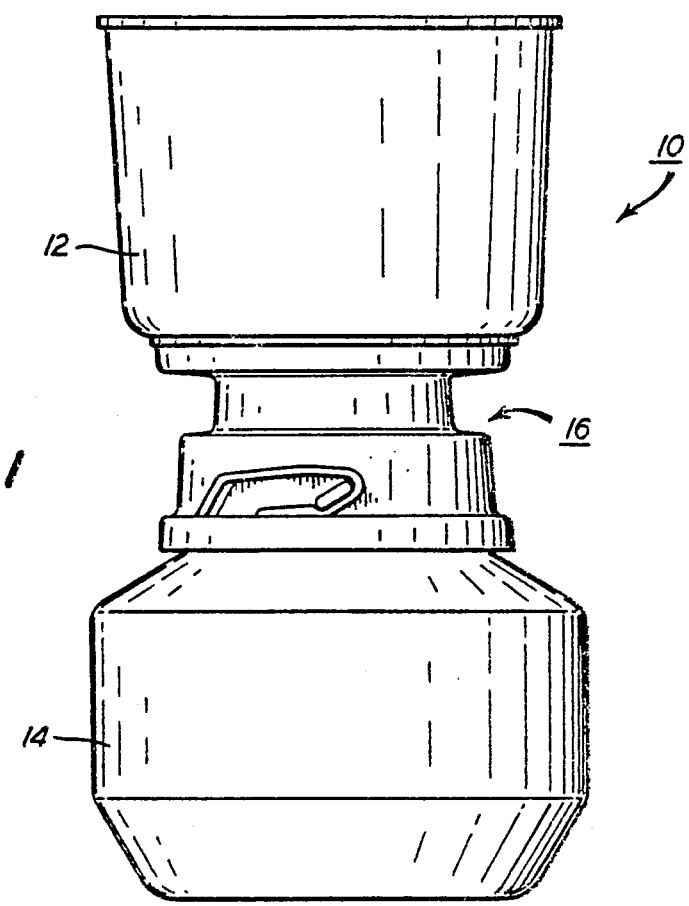
FIG. 1 is an elevation view showing the filtration unit of the present invention.
Figure 3:
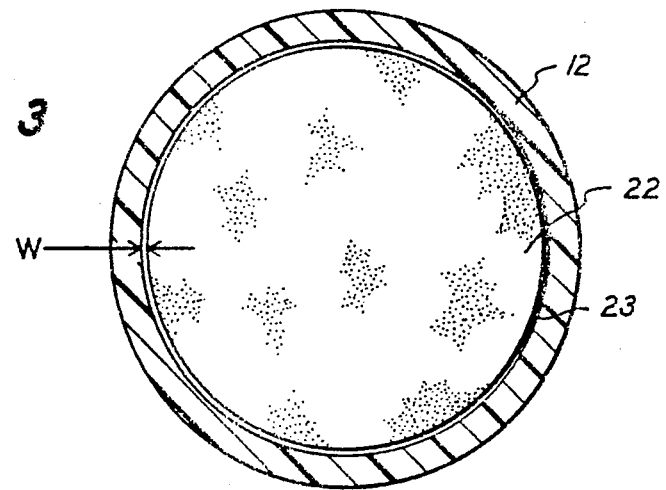
FIG. 3 is a cross-sectional view of the filterware of FIG. 1 taken along line 3—3.
Figure 2:
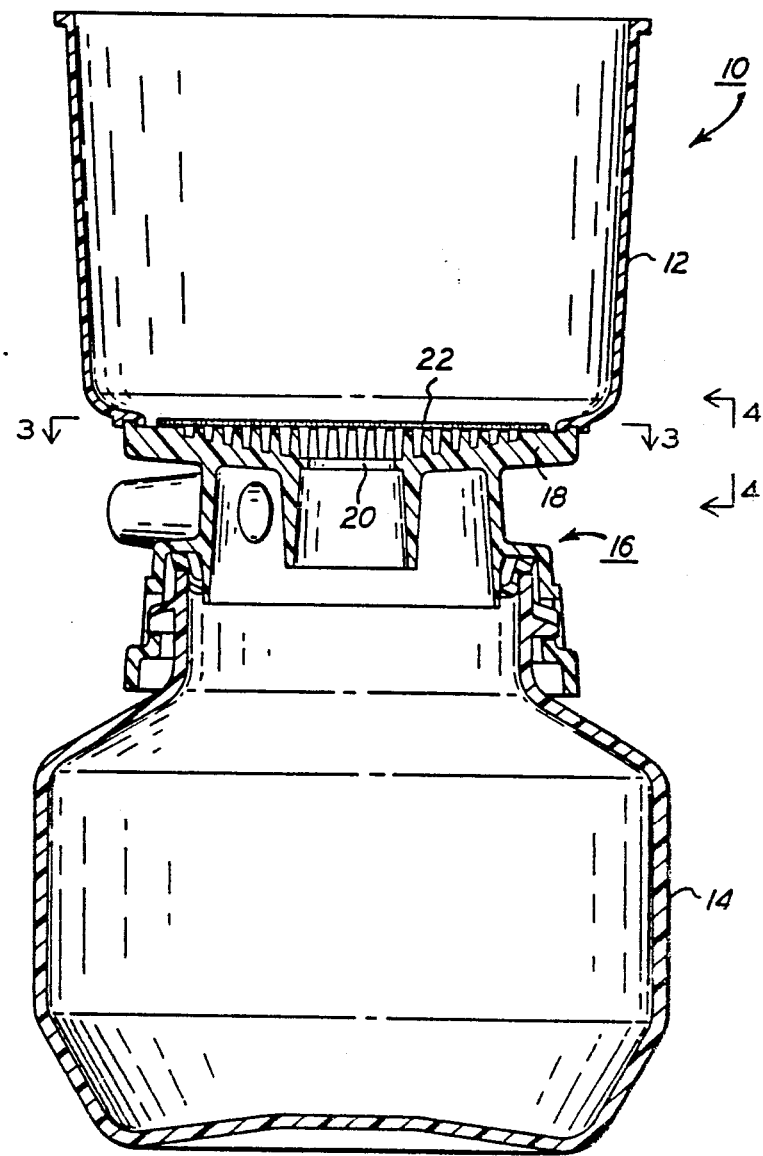
FIG. 2 is a cross-sectional view of FIG. 1.

Referring to FIGS. 1 and 2 there is illustrated a plastic filtration unit 10 made in accordance with the present invention. The unit 10 comprises an upper receiving chamber 12 for receiving a liquid to be filtered and a lower receiving chamber 14 for receiving the filtrate. Between the upper receiving chamber 12 and lower receiving chamber 14 is neck portion 16 having therein a plastic support plate 18 secured thereto. In the particular embodiment illustrated the support plate is secured to the neck portion by ultrasonic welding. However, the support plate may be secured in any desired manner. Support plate 18 is provided with at least one opening 20 for allowing passage of liquid to be filtered. Disposable on top of support plate 18 is a filter membrane 22. Filter membrane 22 is made at least in part of cellulose nitrate, preferably of at least fifty percent (50%) cellulose nitrate and in the embodiment illustrated filter membrane 22 consists essentially of cellulose nitrate. In the embodiment illustrated filter membrane 22 is in the form of a disc having a substantially circular configuration as illustrated in FIG. 3. The cellulose nitrate filter membrane may take any other configuration so desired, for example oval or rectangular. In the particular embodiment illustrated upper receiving chamber 12, lower receiving chamber 14, neck portion 16 and support plate 18 are all made of a plastic material, preferably polystyrene.

Figure 4:
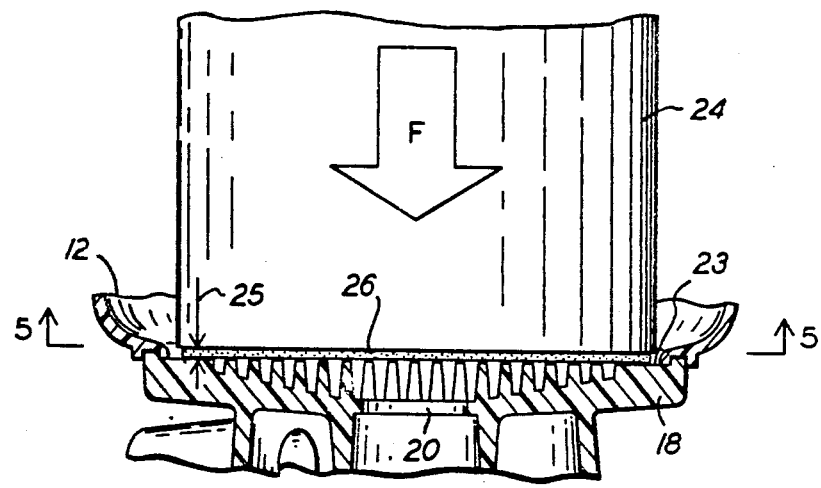
FIG. 4 is a fragmentary side view illustrating how the cellulose filter membrane is attached to the support plate of the filter unit of the present invention.
Figure 5:
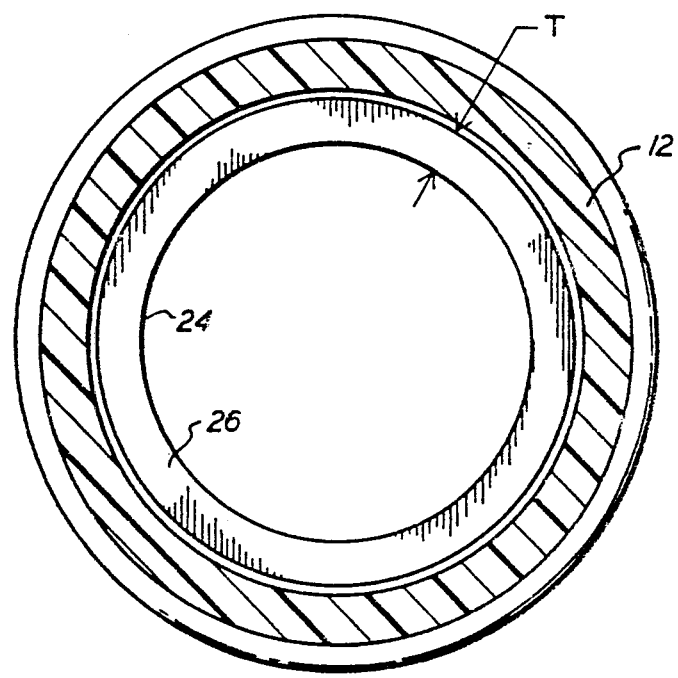
FIG. 5 is a bottom view taken along lines 5—5 of FIG. 4 illustrating the horn used to seal the filter membrane to the filter unit.

Referring to FIGS. 4 and 5 there is illustrated a fragmentary view of the apparatus used to secure the filter membrane 22 to support plate 18. The cellulose nitrate filter membrane 22 is initially disposed upon the surface 23 of support plate 18. Thereafter a horn 24, which is maintained at a temperature capable of welding the membrane 22 to support plate 18, is pressed directly against the outer periphery of the membrane 18 and is maintained at a temperature to cause the filter membrane to be welded to the support plate 8. It is important that the pressure and temperature of the horn be such so as to not cause the cellulose nitrate filter membrane to burst into flames, which of course, would most likely result in destruction of the article. The horn 24 has a substantially cylindrical shell configuration with a thickness T at its lower end 26 sufficient to provide a continuous seal around the outer periphery of the filter membrane so as to prevent liquids from passing beneath the filter membrane to the receiving chamber without first being filtered. Applicants have found that the mold formed on membrane 22 preferably has a cross-sectional width of about 0.090 inches (2.29 mm). A continuous weld of this width has been found quite adequate for sealing of the filtration membrane 22 to the support plate 18 so as to prevent leakage. In the particular embodiment illustrated the thickness T is approximately one-tenth of an inch. However, the thickness T should be as thin as possible, so that a minimum amount of heat need be applied to the cellulose nitrate filter membrane 22. Applicants found that the horn should be maintained at a temperature in the range of 300° F. to 380° F. at its lower mating end 26, preferably in the range of 300° to 350°. The horn 24 is pressed against membrane 18 at a pressure in the range of 15 to 30 PSIG for a time period in the range of approximately 2 to 6 seconds.

Since cellulose nitrate is such a volatile material the thickness of filter membrane 18 should not be too great as to cause a large space between the horn and support plate 26 where the membrane is to be welded. The thicker the membrane 18 the longer the horn will be required to be pressed against the membrane 22 to cause the plastic underneath to melt and adhere to the membrane. In the particular embodiment illustrated the thickness 25 of membrane 22 is about 0.13 mm. The membrane should also have a porosity sufficient to allow appropriate filtering of the liquid and also allow welding of the plastic to the membrane 22. Applicants have found that a porosity in the range of 0.1 to 5.0 microns is satisfactory.

The horn 24 is preferably made of a material having good conductivity and of a sufficient mass to maintain the horn at a relatively constant temperature so as to allow melting of the plastic support plate with relative ease. Applicants have found that steel works quite adequately. While not necessary, the lower end 26 may be coated with a thin layer of teflon so as to minimize potential sticking between the horn and membrane 22. The coating should be sufficiently thin so as to not interfere with the heat transfer function of the horn.

What is claimed is:

1. A method of welding a filter membrane made at least in part of cellulose nitrate to a plastic support plate of a filterware comprising of steps:
   (a) placing the filter membrane on a plastic support plate;
   (b) applying heat and pressure directly, to at least a portion of said filter membrane for a specified time period so as to weld the filter membrane to said plastic support plate without destruction of said filter membrane.

2. The method according to claim 1 wherein said heat and pressure is applied by the use of a substantially cylindrical horn placed at the outer periphery of said membrane.

3. The method according to claim 2 wherein said horn is maintaind at a temperature in the range of 300° F. to 390° F.

4. The method according to claim 2 wherein said horn is pressed against cellulose nitrate filter membrane for a time period in the range of 2 to 6 seconds.

5. A method according to claim 2 wherein said horn is pressed against a membrane in the pressure range of 15 to 30 PSIG.

6. A method according to claim 1 wherein said filter membrane is made essentially of cellulose nitrate.

7. A method of welding a filter membrane made at least in part of cellulose nitrate to a plastic support plate of a filterware comprising the steps of:
   (a) placing a cellulose nitrate membrane on said plastic support plate;
   (b) applying heat and pressure directly to the outer periphery portion of said membrane by a substantially cylindrical horn, having a temperature in the range of 300° or 350° at a pressure in the range of 15 to 30 PSIG for a period of time in the range of 2 to 6 seconds.

8. A method of welding a filter membrane made at least in part of cellulose nitrate directly to a plastic support plate comprising of steps:
   (a) placing the filter membrane on a plastic support plate;
   (b) applying heat and pressure directly to at least a portion of said filter membrane for a specified time period so as to weld the filter membrane to said support plate without destruction of said filter membrane.

9. The method according to claim 8 wherein said heat and pressure is applied by the use of a substantially cylindrical horn placed at the outer periphery of said membrane.

10. The method according to claim 9 wherein said horn is maintained at a temperature in the range of 300° F. to 390° F.

11. The method according to claim 9 wherein said horn is pressed against said cellulose nitrate filter membrane for a period in the range of 2 to 6 seconds.

12. A method according to claim 9 wherein said horn is pressed against a membrane in the pressure range of 15 to 30 PSIG.

13. A method according to claim 8 wherein said filter membrane is made essentially of cellulose nitrate.

* * * * *